US008177170B2

(12) United States Patent
Fol et al.

(10) Patent No.: US 8,177,170 B2
(45) Date of Patent: May 15, 2012

(54) AIRCRAFT COMPRISING A CENTRAL FAIRING THAT ADJUSTS THE PRESSURE ON THE WING STRUCTURES BY MEANS OF LOCAL GEOMETRIC DEFORMATIONS

(75) Inventors: Thierry Fol, Grenade (FR); Philippe Jimenez, Toulouse (FR); Arnaud Namer, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 478 days.

(21) Appl. No.: 12/092,614

(22) PCT Filed: Nov. 6, 2006

(86) PCT No.: PCT/FR2006/002464
§ 371 (c)(1),
(2), (4) Date: Sep. 4, 2008

(87) PCT Pub. No.: WO2007/054635
PCT Pub. Date: May 18, 2007

(65) Prior Publication Data
US 2009/0078830 A1    Mar. 26, 2009

(30) Foreign Application Priority Data
Nov. 8, 2005   (FR) ...................................... 05 11337

(51) Int. Cl.
*B64C 23/00*    (2006.01)
(52) U.S. Cl. .......................... 244/200; 244/201; 244/130
(58) Field of Classification Search .................. 244/198, 244/200, 45 R, 123.1, 129.1, 130, 201
See application file for complete search history.

(56) References Cited

U.S. PATENT DOCUMENTS

| | | | | | |
|---|---|---|---|---|---|
| 2,800,291 | A | * | 7/1957 | Stephens | 244/200 |
| 2,927,749 | A | * | 3/1960 | Brownell | 244/45 R |
| 3,578,265 | A | * | 5/1971 | Patierno et al. | 244/198 |
| 3,734,431 | A | * | 5/1973 | Rhodes et al. | 244/49 |
| 4,314,681 | A | * | 2/1982 | Kutney | 244/54 |
| 4,384,693 | A | * | 5/1983 | Pauly et al. | 244/207 |
| 4,471,925 | A | * | 9/1984 | Kunz | 244/130 |
| 4,478,377 | A | * | 10/1984 | Fletcher et al. | 244/12.5 |
| 4,506,848 | A | * | 3/1985 | Fletcher et al. | 244/12.4 |

(Continued)

FOREIGN PATENT DOCUMENTS
FR    2 827 029    1/2003

OTHER PUBLICATIONS
U.S. Appl. No. 12/299,621, filed Nov. 5, 2008, Fol, et al.

*Primary Examiner* — Benjamin P Lee
(74) *Attorney, Agent, or Firm* — Oblon, Spivak, McClelland, Maier & Neustadt, L.L.P.

(57) ABSTRACT

An aircraft including: a fuselage and two wings to which engine nacelles are attached and that are each connected laterally to the fuselage, one on each side thereof, by a central fairing. The central fairing includes, facing each wing, two opposed surfaces connected one to a suction face side and the other to a pressure face side of the wing and that extend longitudinally along the fuselage. At least one of the two surfaces includes at least one local geometric deformation configured to generate lateral aerodynamic disturbances on the central fairing toward the wing to control the flow of air over the wing.

20 Claims, 9 Drawing Sheets

U.S. PATENT DOCUMENTS

| | | | |
|---|---|---|---|
| 4,624,425 A * | 11/1986 | Austin et al. | 244/13 |
| 4,776,537 A * | 10/1988 | Garside et al. | 244/135 R |
| 5,779,189 A | 7/1998 | Hamstra et al. | |
| 5,899,413 A * | 5/1999 | Hager et al. | 244/130 |
| 6,149,101 A * | 11/2000 | Tracy | 244/130 |
| 6,152,404 A * | 11/2000 | Flaig et al. | 244/199.1 |
| 6,409,126 B1 * | 6/2002 | Cunningham, Jr. | 244/130 |
| 6,655,635 B2 * | 12/2003 | Maury et al. | 244/131 |
| 6,964,397 B2 * | 11/2005 | Konings | 244/199.1 |
| 7,407,135 B2 * | 8/2008 | Rouyre | 244/119 |
| 7,510,144 B2 * | 3/2009 | Iglesias et al. | 244/87 |
| 7,607,614 B2 * | 10/2009 | Rouyre | 244/131 |
| 7,614,588 B2 * | 11/2009 | Birkenstock | 244/200 |
| 2003/0006344 A1 * | 1/2003 | Pauly | 244/130 |
| 2003/0066933 A1 | 4/2003 | Maury et al. | |
| 2005/0116107 A1 * | 6/2005 | Morgenstern et al. | 244/130 |
| 2005/0247821 A1 * | 11/2005 | Rouyre | 244/129.1 |
| 2006/0006287 A1 * | 1/2006 | Ferguson et al. | 244/130 |
| 2006/0065784 A1 * | 3/2006 | Rouyre | 244/119 |
| 2009/0032639 A1 * | 2/2009 | Dantin et al. | 244/37 |
| 2009/0230251 A1 * | 9/2009 | Bonnaud et al. | 244/198 |
| 2010/0059624 A1 * | 3/2010 | Fol et al. | 244/62 |
| 2010/0282907 A1 * | 11/2010 | Martin Hernandez | 244/130 |

* cited by examiner

AIRCRAFT COMPRISING A CENTRAL FAIRING THAT ADJUSTS THE PRESSURE ON THE WING STRUCTURES BY MEANS OF LOCAL GEOMETRIC DEFORMATIONS

BACKGROUND

The invention relates to an aircraft and more particularly concerns the central fairing that ensures the junction between the fuselage and each wing of the aircraft.

In the aeronautical sector, numerous ongoing research efforts are being made to improve the performances of airplanes under diverse flying conditions (cruising flight, fast cruising flight, start of descent, flight envelope limits, etc.).

In addition, for various reasons concerning, for example, increasing the autonomy of airplanes or else increasing the useful load transported by the airplanes, it may be necessary to replace the existing engines of the airplanes by larger engines.

This results in some degradation of the aerodynamic performances of airplanes remotorized in this way.

SUMMARY

The aeronautical manufacturers are therefore trying to achieve better performances of remotorized airplanes without jeopardizing the wing structures thereof.

To this end, the present invention is directed at an aircraft comprising:
 a fuselage,
 two wings, to which there are fixed the engine nacelles and which are each joined laterally to the fuselage on opposite sides thereof by a central fairing, the central fairing being provided, in correspondence with each wing, with two opposite surfaces that are joined respectively to the upper and lower surfaces of the wing in question and that extend longitudinally along the fuselage,
characterized in that at least one of the two surfaces has at least one local geometric deformation that is adapted to generate lateral aerodynamic perturbations from the central fairing toward the wing in order to control the airflow over the wing.

By imposing an appropriate geometric shape locally on at least one of these surfaces, the fairing conformed in this way is capable of acting favorably on the airflow of the wing structure by generating pressure waves that propagate in the direction of the free tip of the wing in question.

These pressure waves make it possible to reorganize the pressure field over the wing structure at a distance.

It will be noted that the choice of local geometric deformations imposed on the fairing surfaces makes it possible to reduce the aerodynamic drag of the aircraft without significantly modifying its weight or its manufacturing cost.

The pressure waves generated by one or more deformed zones of the surface in question may be expansion waves, compression waves or a combination of the two, depending on the nature of the geometric deformation or deformations.

The local geometric deformation or deformations may extend longitudinally along the fuselage.

It will be noted that in the prior art, special shaping on the central fairing is not provided, and the surfaces forming the envelope of the fairing generally have very slight and regular overall longitudinal curvature, or even zero curvature.

In contrast, the invention provides for imposing on at least one of the surfaces of the fairing a curvature that is more pronounced than in the prior art on one or more surface zones in question.

This curvature is formed primarily in a longitudinal direction along the fuselage (primary curvature) and secondarily in a transverse direction corresponding to the height of the fuselage (secondary curvature).

According to one characteristic, the said at least one local geometric deformation is manifested by a reduction of the local radius of curvature of at least one surface zone in question.

In the absence of the invention, on the other hand, the local radius of curvature (along the entire surface) has a very high and even infinite value, because the overall longitudinal curvature of the surface is very slight or even zero.

According to one characteristic, the said at least one local geometric deformation has a location and an amplitude that depend in particular on aerodynamic parameters of the aircraft.

Thus, to achieve the sought effect on the airflow over the wing structure, it is preferable to make allowance for these parameters in order to conform the affected surface or surfaces of the fairing locally.

According to one characteristic, the aerodynamic parameters are those relating to the fuselage, to the wings, to the engine nacelles and to the speed of the aircraft.

According to one characteristic, the local geometric deformation has the form of a local convexity, which makes it possible to create an expansion wave in the flow.

According to one characteristic, the convexity has the form of a hump.

According to one characteristic, the local geometric deformation has the form of a local concavity, which makes it possible to create a compression wave in the flow.

According to one characteristic, the concavity has the form of a hollow.

According to one characteristic, the hollow is formed by two inclined surface portions that intersect at the bottom of the hollow in a zone of slope discontinuity.

According to one characteristic, at least one of the two surfaces has a plurality of successive local geometric deformations extending along the fuselage and alternating locally between convexity and concavity.

By making a plurality of convexities and concavities successively, there is thus achieved fine control of the flow over the wing structure, making it possible to adapt optimally to the characteristics of the wing structure and to the manufacturing constraints.

According to one characteristic, the said at least one local geometric deformation is made on the surface joined to the upper surface of the wing.

The modification of the upper fairing is particularly adapted to regulation of the supersonic zone of the upper surface of the wing.

According to one characteristic, the said at least one local geometric deformation is made on the surface joined to the lower surface of the wing.

The modification of the lower fairing is particularly adapted to regulation of pressure gradients over the lower surface of the wing.

According to one characteristic, the central fairing is provided with an assemblage of a plurality of structural elements, each having a surface portion, each of the opposite surfaces of the central fairing in correspondence with each wing being formed by a group of surface portions of structural elements arranged next to one another.

BRIEF DESCRIPTION OF THE DRAWINGS

Other characteristics and advantages will become evident in the course of the description hereinafter, given solely on a limitative basis and written with reference to the attached drawings, wherein:

FIGS. 6c and 6d are respective partial schematic views from above and in perspective of the interface of FIGS. 6a and 6b, with geometric shaping according to the invention illustrated in FIG. 4a;

DETAILED DESCRIPTION

Figure 1:
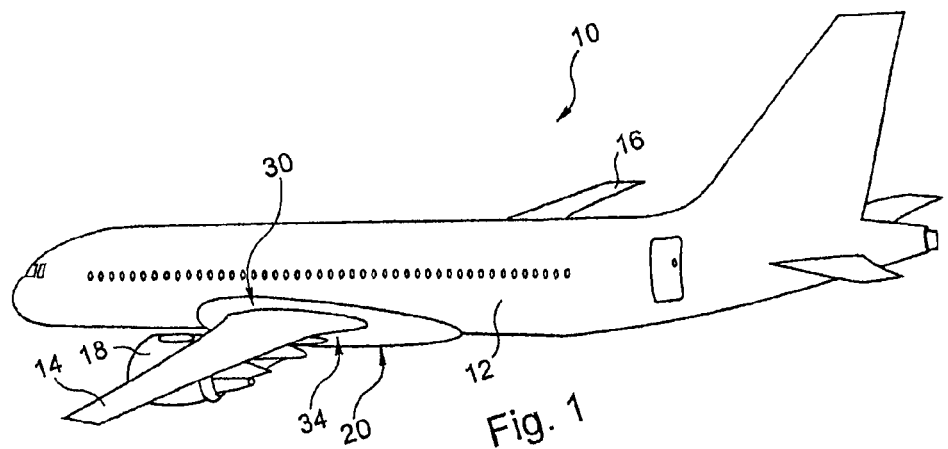
FIG. 1 is a schematic general view of an aircraft according to the invention.

As illustrated in FIG. 1 and denoted by general reference 10, an aircraft according to the invention comprises a fuselage 12, whose wing structure comprises two lateral wings 14, 16, which are each joined laterally to the fuselage, on opposite sides thereof, by a fuselage/wing-structure interface.

Engine nacelles are fixed to wings 14, 16, and, for example, one engine nacelle 18 is attached to each wing, as illustrated in FIG. 1.

The fuselage/wing-structure interface comprises a structural mechanical interface (not illustrated in the figures), which is covered by an aerodynamic interface composed of central fairing 20.

Figure 2:
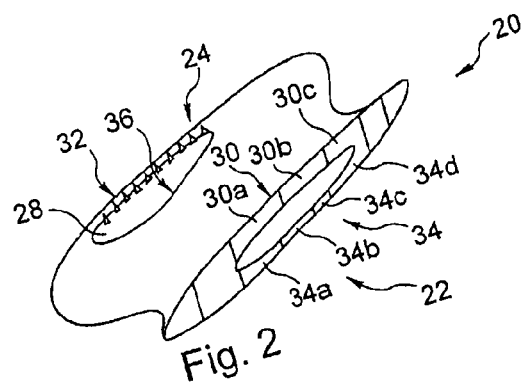
FIG. 2 is a schematic view of a central fairing of an aircraft.

Central fairing 20 is composed of an assemblage of a plurality of structural elements forming plates or panels disposed in joined configuration and riveted or bolted to the underlying mechanical interface and which give the whole a shell-like shape (FIG. 2).

The central fairing of FIGS. 1 and 2 is provided with two parts 22, 24, which are respectively in correspondence with wings 14, 16. In left part 22 and right part 24 there are respectively made two openings 26 and 28 for joining each of the two wings 14, 16.

Each part of the central fairing in correspondence with a wing is provided with two opposite surfaces, an upper surface 30 for part 22, 32 for part 24 and a lower surface 34 for part 22, 36 for part 24, which surfaces are joined respectively to the upper and lower surfaces of the wing in question.

As illustrated in FIG. 2, the structural elements forming the central fairing each have a surface portion forming part of a fairing surface. More particularly, each of the opposite upper and lower surfaces of each part 22, 24 of the central fairing is formed by a group of surface portions of the aforesaid structural elements, these surface portions being arranged next to one another in such a way as to form a smooth surface of the aerodynamic interface.

Thus, in FIG. 2, upper surface 30 is provided with joined structural elements 30a, 30b, 30c, while lower surface 34 is provided with joined structural elements 34a, 34b, 34c, 34d.

Figure 3:
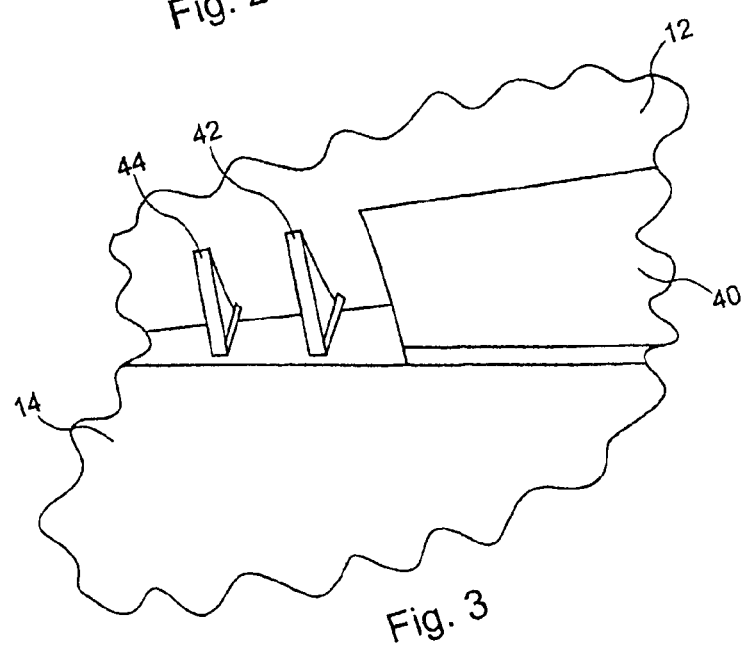
FIG. 3 is a partial schematic view showing the assemblage of constituent structural elements of the fairing.

FIG. 3 illustrates, in partial manner, a constituent structural element 40 (panel) of upper surface 30, which element is mounted on fuselage 12 in correspondence with wing 14. Fixation supports in the form of angle pieces 42, 44 integral with the fuselage and waiting to receive another structural element of the central fairing are also illustrated. The fixation supports are also visible in FIG. 2.

In the prior art, the upper surface of each central fairing, or in other words that surface which is in contact with the upper surface of the wing structure, and the lower surface thereof, that surface which is in contact with the lower surface of the wing structure, traditionally have very slight and regular overall curvature, or even zero curvature in certain aircraft.

The invention provides for shaping one and/or the other of these surfaces by imposing locally, on one or more zones of the surface in question, one or more geometric deformations extending, for example, longitudinally along the fuselage.

The local geometric deformation or deformations of the surface or surfaces are adapted to generate lateral aerodynamic perturbations, which, beginning from the central fairing, are capable of traveling in the direction of the tip of the wing in question, specifically with a view to controlling the airflow over the wing.

The addition of lateral three-dimensional shapes on each central fairing, whether by addition of structural elements conformed on the existing structural elements of the central fairing or by replacement of one or more of the latter by conformed structural elements, makes it possible to control the airflow over the wing structure and to control interferences that tend to occur, for example, in the case of remotorization (larger engine, engine with greater bypass ratio, increase of the autonomy and/or of the useful load transported by the aircraft).

The modification of the geometry of the central fairing constituting the junction between the fuselage and the wing structure according to the invention makes it possible to adjust the air pressure over the wing structure, especially by improving the pressure field that is developed over the upper and/or lower surface of the wing structure depending on the fairing part affected by shaping (upper and/or lower part).

Thus the modification of the local geometry of one or both opposite surfaces of each part 22, 24 of the central fairing, which are joined respectively to the upper and lower surfaces of the wing structure, makes it possible in particular to improve the airflow over the wing in the case of pronounced interference between the wing, the engine nacelle or nacelles and the fuselage.

The invention makes it possible in particular to improve the aerodynamic performances of the airplane under different flying conditions (cruising, fast cruising, start of descent, limit of the flight envelope) and also to improve the flexibility of the airplane for high Mach numbers.

It will be noted that the elements forming the opposite upper and lower surfaces of each part 22, 24 of the fairing may be made of a material amenable to being deformed in flight by actuators in order to adapt the efficacy of the invention to a broad range of flying conditions.

The deformation is then induced by a displacement of the surface or of a portion thereof.

The local geometric deformation or deformations made to the surfaces of the fairing can then be achieved dynamically and in a manner adapted (in real time) as a function of the flying conditions and of the sought effect.

Each local geometric deformation is characterized by its shape, which will be described in detail hereinafter, as well as by its location on the surface, along the fuselage (for example, relative to the leading edge of the wing) and by its amplitude.

The location and amplitude of the geometric shapes imposed locally on the surface depend in particular on aerodynamic parameters of the aircraft.

These parameters are in particular the aircraft speed and the parameters that relate to the fuselage, to the wing structure and to the engines.

Figure 4A:
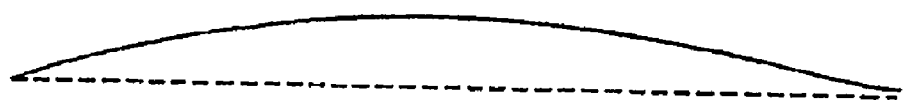
FIGS. 4a, 4b and 4c illustrate views from above of three examples of possible geometries for the fuselage/wing-structure intersection of the aircraft of FIG. 1.
Figure 4B:
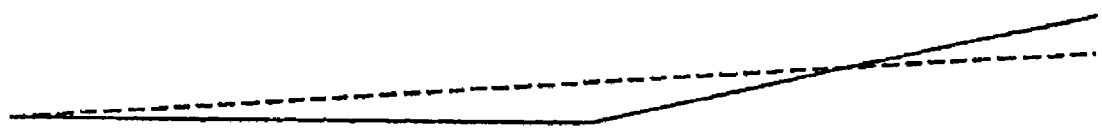
Figure 4C:

When the surface profile of the central fairing joined to the upper surface of the wing is viewed from above, three types of geometric shapes are envisioned, as represented by solid lines in FIGS. 4a, 4b and 4c.

It will be noted that, in these figures, the front of the aircraft is situated on the left of the drawing and the rear is situated on the right.

The local geometric singularities made on one and/or the other of the two opposite surfaces of the central fairing are manifested by a decrease of the local radius of curvature of the surface in question.

The shapes represented in FIGS. 4a-c correspond to the primary curvatures of the geometric deformations envisioned, the secondary curvatures being made perpendicular to the plane of the figures (along the height of the fuselage) and being of smaller extent than that of the primary curvatures.

The local geometric shape illustrated in FIG. 4a has the appearance of a local convexity, such as a hump extending primarily in longitudinal direction along the fuselage (primary curvature) and, in less pronounced manner, in a direction perpendicular to the plane of the figure (secondary curvature).

Such local shaping of the surface is capable of creating lateral perturbations that propagate from the central fairing toward the wingtip and that have the form of expansion waves of the flow.

FIG. 4a also shows, as broken lines, the profile of the central fairing viewed from above in the absence of the invention.

As illustrated in FIG. 4b, another possible geometric shape has the appearance of a local concavity, which has the form, for example, of a hollow extending primarily in the longitudinal direction of the fuselage (primary curvature) and secondarily in a direction perpendicular to the plane of the figure (secondary curvature).

Such a local geometric deformation is capable of creating lateral perturbations that propagate from the central fairing toward the wingtip and that have the form of compression waves of the flow, initiating a weak shock.

This figure also shows, as broken lines, the profile of the central fairing viewed from above in the absence of the invention.

More particularly, the hollow is formed by two inclined surface portions that intersect at the bottom of the hollow in a slope discontinuity zone.

It will also be noted that such a geometry has the appearance of a ramp, and that the local concavity may or may not comprise a break at the bottom thereof.

It is possible, in fact, that the bottom of the hollow does not comprise a discontinuity zone and has the form of a bowl.

The simplicity of industrial implementation makes it possible to decide whether it is preferable to have a distinct slope discontinuity (coinciding, for example, with a joint between two panels constituting structural elements of the fairing), or whether it is preferable to insert a small joint radius between the two zones having different slopes dictated by the aerodynamic adaptation (for example, in the case of a single structural panel integrating the two zones having different slopes).

FIG. 4c shows a plurality of successive local geometric deformations extending along the fuselage and alternating locally between convexity and concavity. The deformations have less pronounced extent in a direction perpendicular to the plane of the figure.

More particularly, the geometric shape illustrated in FIG. 4c comprises the succession of a first convexity, a concavity and a second convexity.

Such local geometric modifications of the surface of the central fairing are capable of creating lateral perturbations in the form of isentropic expansion waves or compression waves.

It will be noted that the geometric deformations proposed in FIGS. 4a-c are generally manifested by a large variation of local curvature and more particularly by a large decrease of the local radius of curvature (as viewed in longitudinal section of the fairing) compared with the generally large radius of curvature adopted in the prior art for opposite lateral surfaces of the fairing.

Furthermore, any other combination of convexity and concavity can also be envisioned according to the sought objective: a single convexity followed by a concavity or vice versa, two concavities bracketing a convexity, etc.

Figure 5A:
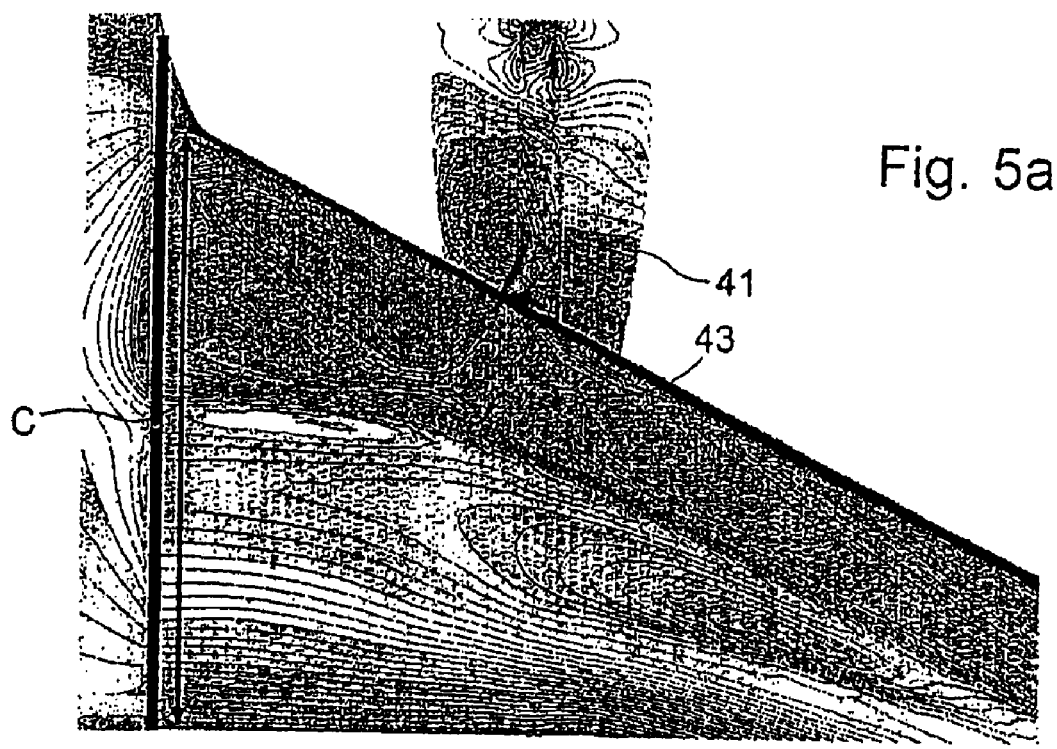
FIGS. 5a and 5b respectively illustrate the distribution of pressure fields over the wing structure without the invention and with the invention.
Figure 5B:
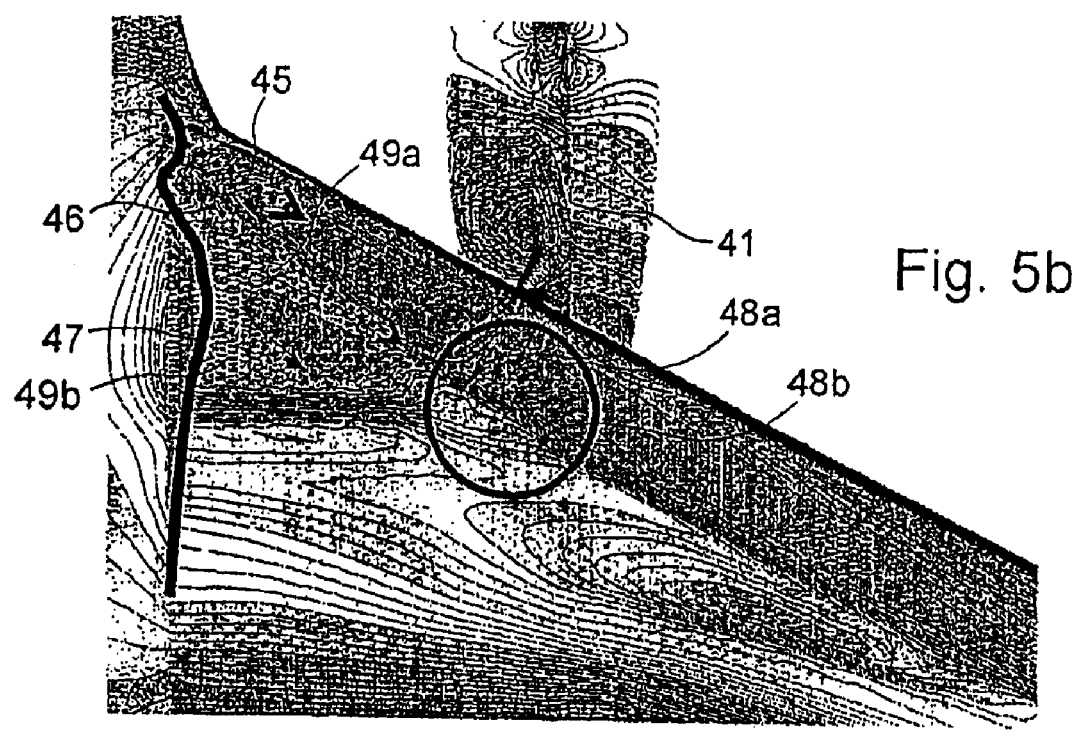

FIGS. 5a and 5b illustrate the distribution of pressure fields, banded by isobaric lines, over the upper surface of a wing without and with the invention respectively.

It will be noted that the low-pressure zones are dark-colored and the high-pressure zones are light-colored.

Thus, in the absence of the invention, there is seen in FIG. 5a, facing engine nacelle 41a zone 43 forming a system of closely spaced isobaric lines corresponding to a large pressure gradient.

Such a zone is therefore the site of depression and compression phenomena at high rates, which is detrimental, since it generates shock drag.

In FIG. 5b, the upper flank of the fairing (parts 22 and 24) has been shaped specifically by means of appropriate geometric deformations of the type illustrated in FIG. 4c in order to create an expansion wave 45, a compression wave 46 and an expansion wave 47 successively in the airflow over the wing structure.

These pressure waves (fluctuations between high pressure and low pressure) propagate laterally relative to the longitudinal direction of the fuselage, from the fairing toward the wingtip in the midst of zones of supersonic speed existing over the upper surface of the wing structure. These pressure waves interact with the flow of the wing structure firstly at a short distance from the fairing: first expansion wave 45 and compression wave 46 contribute to raising the local pressure in zone 49a to the point that a slight shock is obtained, and second expansion wave 47 contributes to reducing the pressure gradient in zone 49b.

The phenomena initiated in zones 49a and 49b propagate in the direction of the wing span, thus making it possible to control the flow of the wing structure by reorganizing the pressure gradient over the wing structure at a distance from the fairing, and especially in zone 43.

It will be noted that, depending on the type, number, location and amplitude of the geometric deformations, it is possible to generate adapted pressure waves that will act on the wing structure at the desired distance relative to the fairing, by adjusting the pressure field (reorganizing the pressure lines) in appropriate manner relative to the sought objective.

More particularly, the reorganization of the pressure field in zone 43 facing the engine nacelle is manifested by a spreading of the pressure lines in this zone in order to reduce the pressure gradient therein and by a spatial redistribution of these pressure lines.

Thus two small systems 48a and 48b of pressure lines that are less closely spaced than previously appear in this zone and are the site of two small successive pressure rises where one large pressure gradient previously prevailed.

As a result, the wave drag of the aircraft is reduced.

In this way the perturbations caused by the interaction between the engine nacelles (in the case of remotorization) and the surface of the central fairing are significantly reduced, which perturbations would affect the behavior of the wing in its supersonic part in the absence of the invention.

It will be noted that the appearance of the distribution of the pressure lines of flow over the wing structure in the absence of the invention as well as the manufacturing and maintenance constraints govern the choice of local geometry of the fairing among the different types illustrated in FIGS. 4a-c.

Figure 6A:
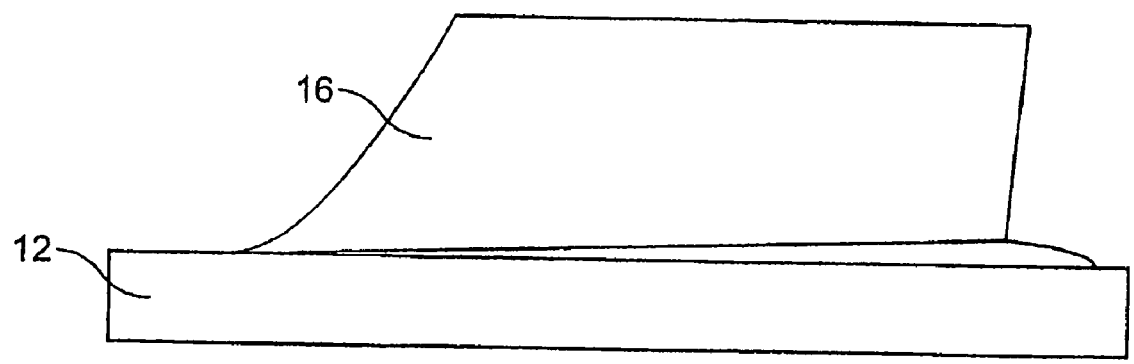
FIGS. 6a and 6b are respective partial schematic views from above and in perspective of the fuselage/wing-structure interface on an aircraft of the A340 type, without special geometric shaping thereof.
Figure 6C:
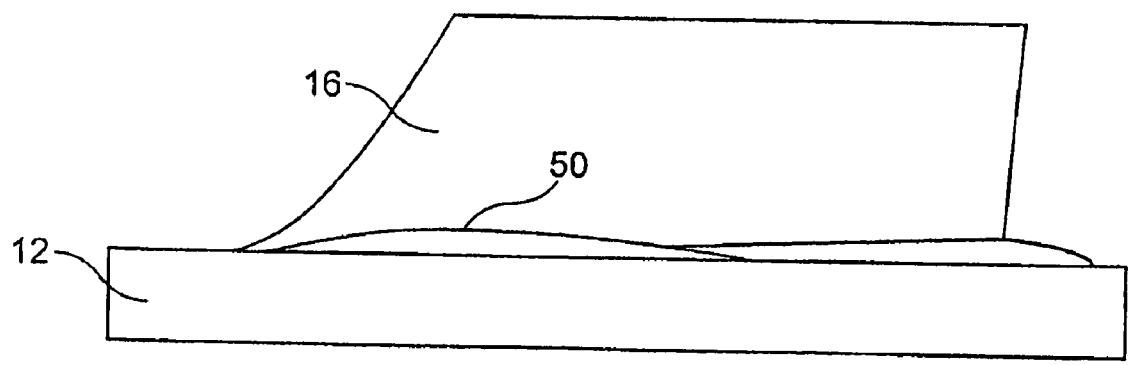
Figure 6B:
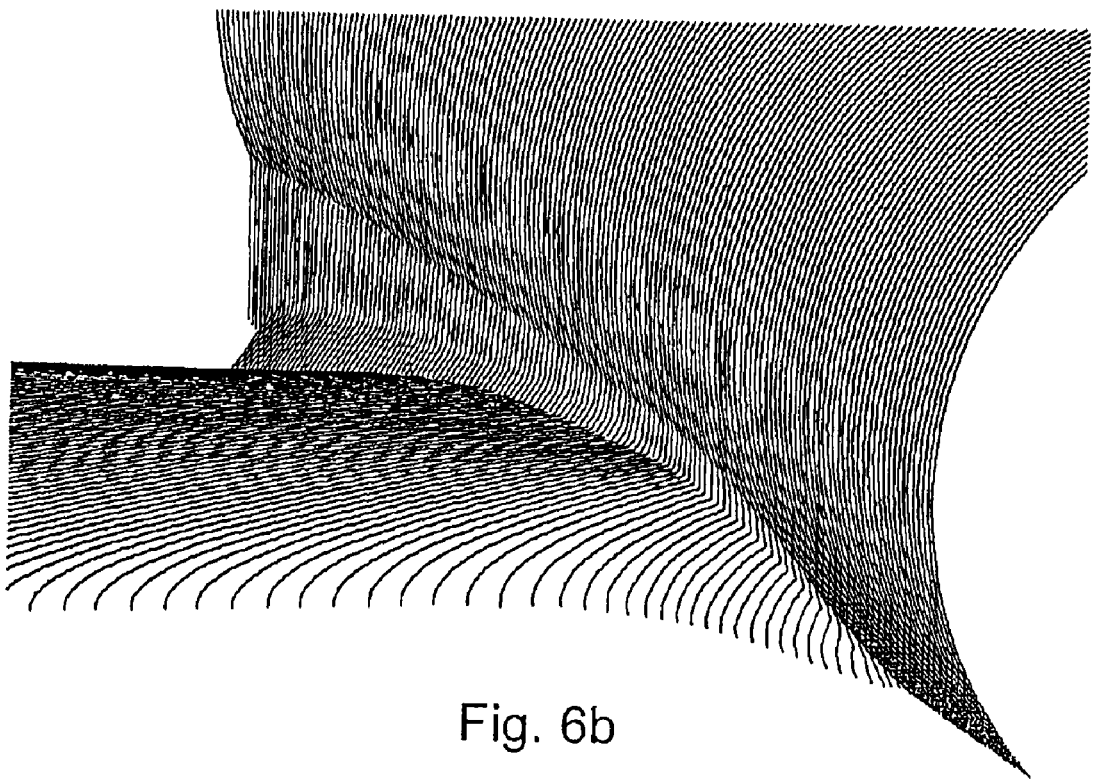

FIGS. 6a and 6b represent an aircraft of A340-500/600 type, on which no special shaping of the profile of the fairing surface (viewed from above) was performed.

FIG. 6b illustrates, in a perspective view, the fuselage/wing-structure interface without any special curvature.

It will be noted that, in the case of remotorization of the aircraft with such an interface, the shock recompressions situated over the upper surface of the wing structure prove to be violent and generate drag.

Figure 6D:
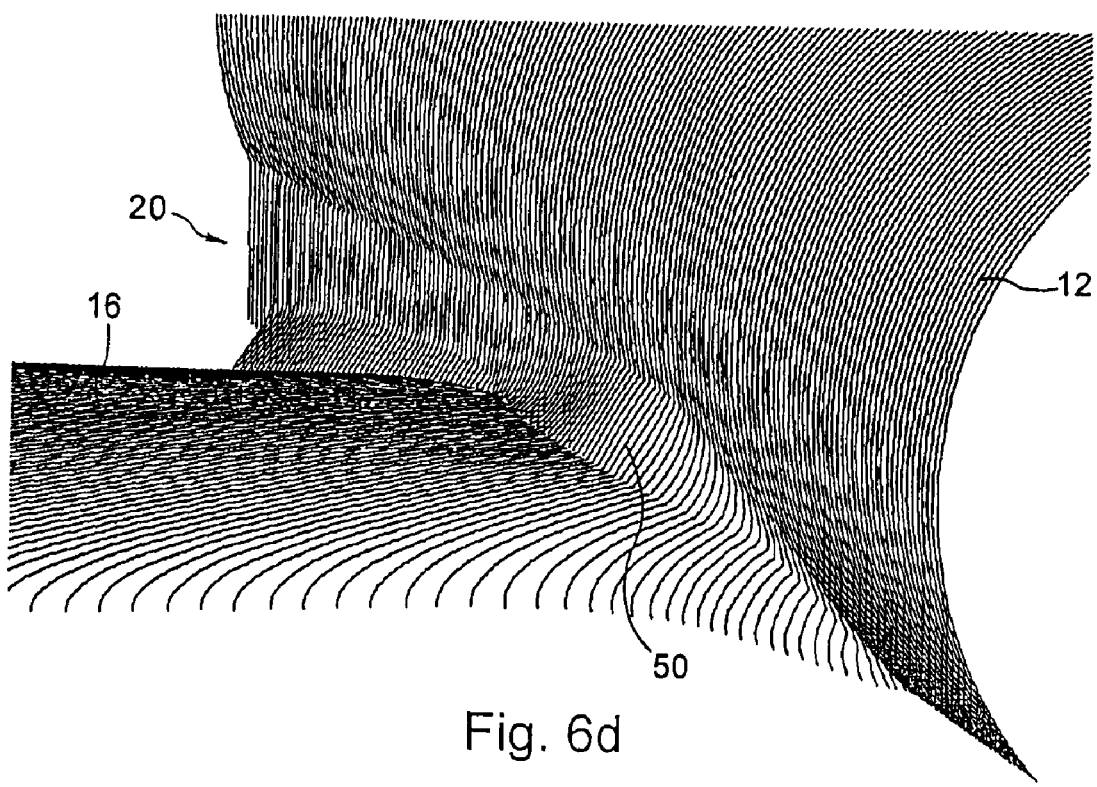

FIGS. 6c and 6d illustrate the addition of a local convexity 50 (of the type illustrated in FIG. 4a) to the surface of the central fairing in the left part of the figure, or in other words close to the leading edge of the wing structure.

This local convexity has the form of a hump that extends along the fuselage, as the figures show, and that also has a lateral extension (amplitude) in the direction of the wingtip (FIG. 6c) and a vertical extension along the height of the fuselage (FIG. 6d).

Hump 50 illustrated in FIGS. 6c and 6d begins close to the leading edge, continues in the flow direction (along the longitudinal direction of the fuselage) and ends close to the joint between the fixed part of the wing structure and the flaps (right part of FIG. 6c).

It will be noted that the maximum amplitude of the hump ranges between 25% and 35% of the wing root chord, this value being adjustable according to the airflows over the wing structure.

It will be noted that the wing root chord is illustrated in FIG. 5a and denoted by the reference "c".

The extension of the hump in the direction of the wingtip (amplitude) is 600 mm, for example, its being understood that this value is adjustable according to the airflows over the wing structure.

This local geometric deformation of the surface of the central fairing was introduced, for example, by adding structural elements (panels of the type illustrated in FIG. 3) conformed in adapted manner, and it allows the air pressure over the wing structure to be adjusted by generating expansion waves propagating in the direction of the wingtip. These waves interact in controlled manner with the pressure waves of the pressure field prevailing over the wing structure, in the space that surrounds it and is perturbed by the interaction between the engine nacelles and the wing structure.

This interaction causes an advantageous modification of the topology of the pressure field and therefore control thereof.

Figure 7A:
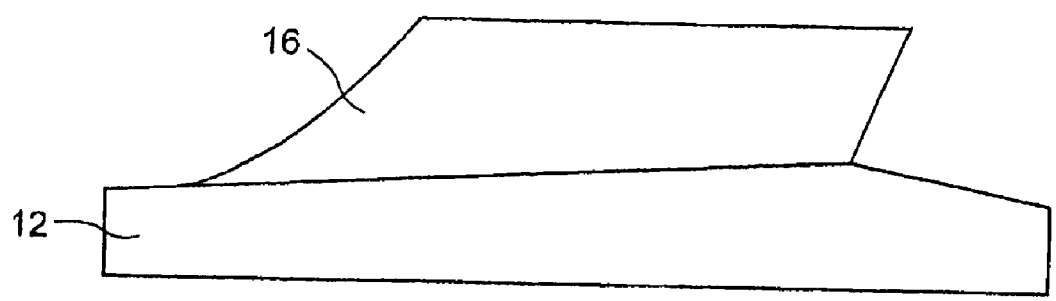
FIGS. 7a and 7b are respective partial schematic views from above and in perspective of the fuselage/wing-structure interface on an aircraft of the A380 type, without special geometric shaping thereof.
Figure 7C:
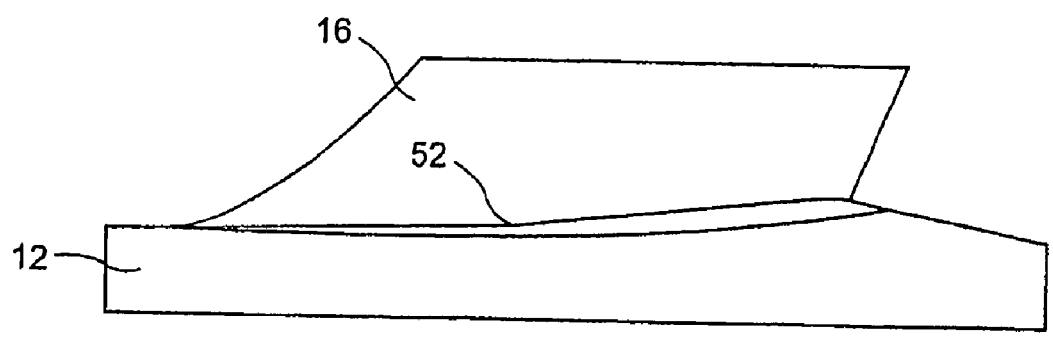
FIGS. 7c and 7d are respective partial schematic views from above and in perspective of the fuselage/wing-structure interface of FIGS. 7a and 7b respectively, with geometric shaping according to the invention illustrated in FIG. 4b.
Figure 7E:
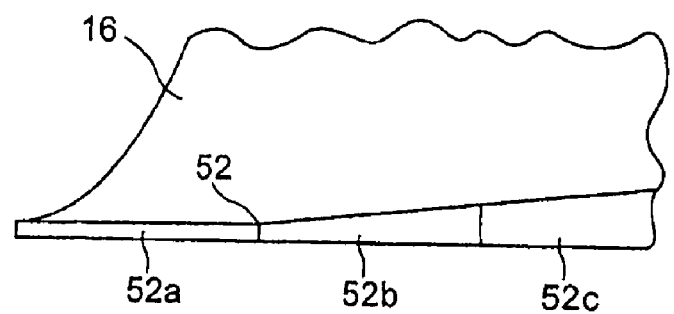
FIG. 7e represents, in partial schematic manner, a view from above of the profile of the structural elements constituting the fairing.
Figure 7B:
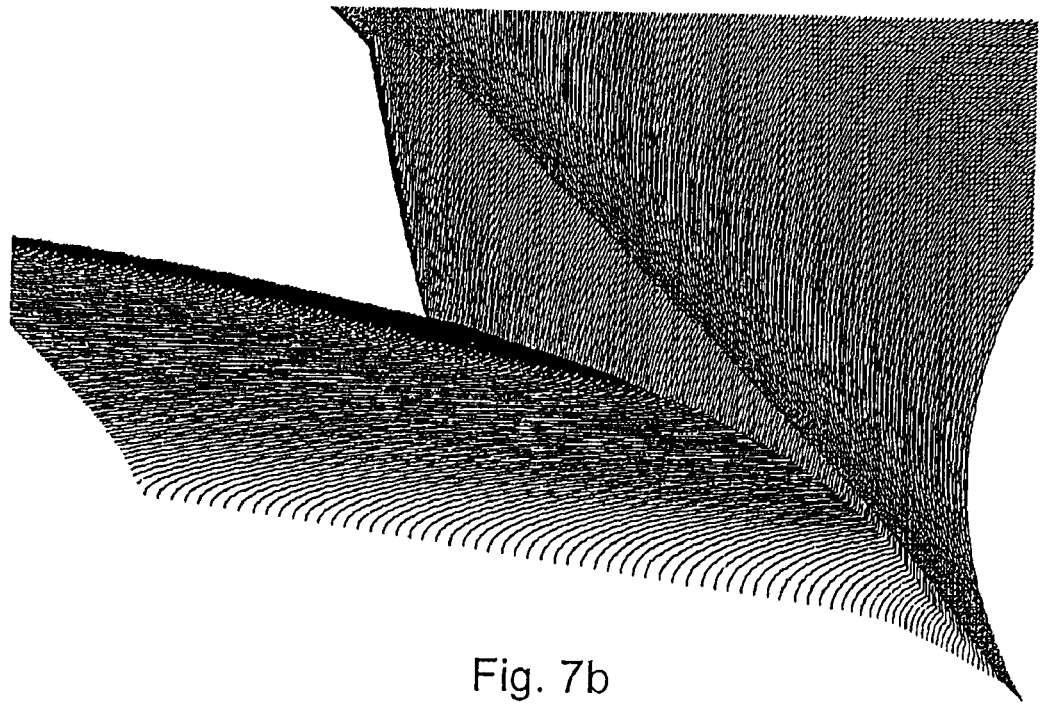

FIGS. 7a and 7b represent the central fairing of an aircraft of A380 type, without special shaping of its surface in contact with the upper surface of the wing.

It will be noted in the view from above that the surface has very slight and even zero overall curvature.

Figure 7D:
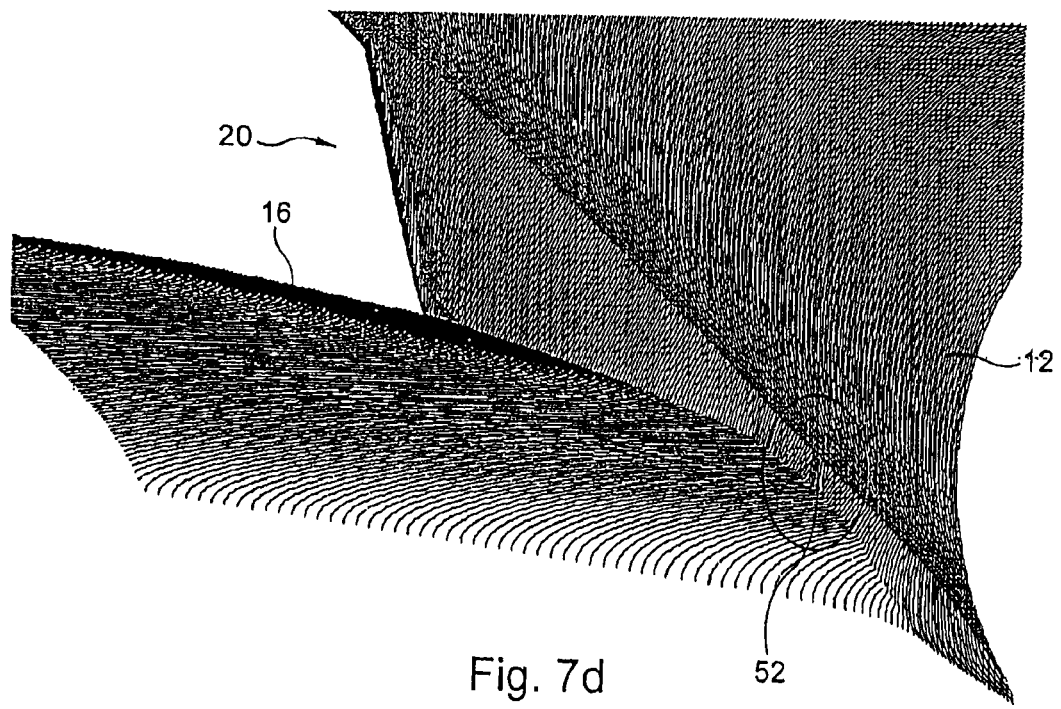

As illustrated in FIGS. 7c and 7d, the surface of the central fairing has been modified by addition of a system for adjusting the pressure over the wing structure of a special type, which is that illustrated in FIG. 4b.

A plurality of structural elements (panels of FIG. 3) have been carried over to the existing upper surface of the central fairing represented in FIG. 7a, in order locally to introduce a concavity 52 into the profile of this surface.

It will be noted that the structural elements, of which the outer wall comprises a slope or a slope portion or even the entire concavity, may themselves also be the constituent structural elements of the upper and/or lower surface of each part of the fairing, such as the panel of FIG. 3.

Concavity 52 is manifested in particular by a hollow with slope discontinuity between two surface portions, the slope of the surface portion placed on the side of the leading edge forming an angle of 0°, for example, while the slope of the surface portion situated on the side of the trailing edge forms an angle of 5°, for example.

The hollow defined by the distinct slope discontinuity of several degrees is disposed longitudinally along the fuselage, starting from the leading edge, at a distance situated between 20% and 35% from the wing root chord.

It will be noted that this value, as well as the values of the slopes of the two surfaces forming the concavity, are adjustable according to the local flow velocity over the wing structure.

FIG. 7e (view in longitudinal section of the fairing) shows three structural panels 52a-c arranged in fixed manner side-by-side along the fuselage in order to impart the desired profile (hollow 52 with slope discontinuity) to the upper surface of the central fairing. In this configuration, the hollow is formed at the limit between the two adjacent panels 52a and 52b.

Figure 8A:
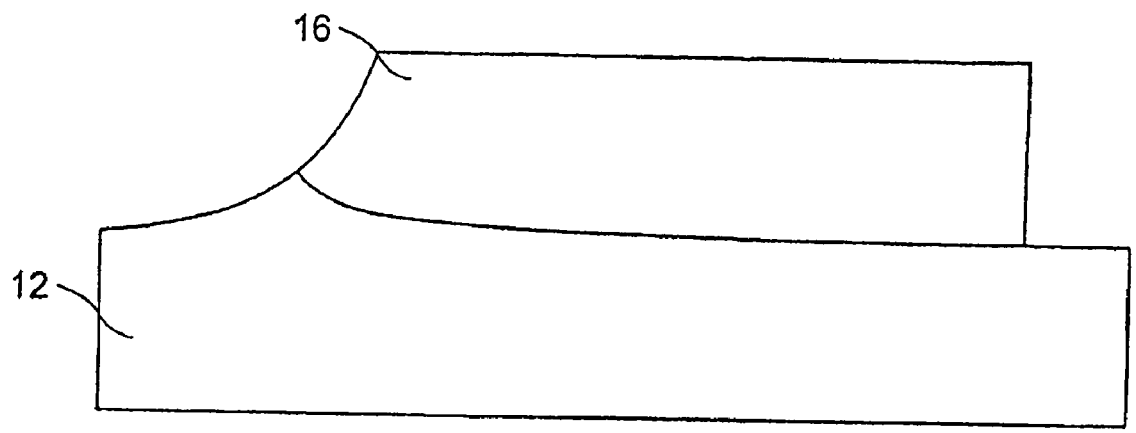
FIGS. 8a and 8b are respective partial schematic views from above and in perspective of a fuselage/wing-structure interface on an aircraft of the A320 type, without special geometric shaping thereof.
Figure 8C:
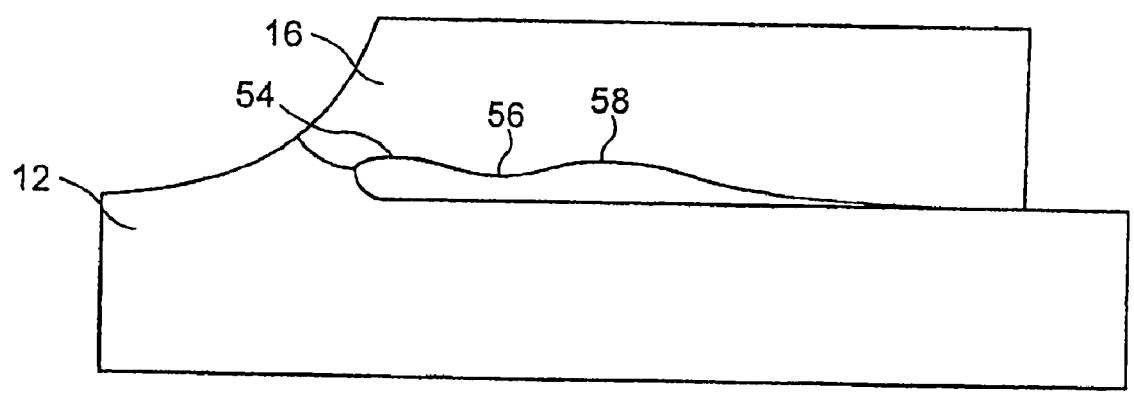
FIGS. 8c and 8d are respective partial schematic views from above and in perspective of the fuselage/wing-structure interface of FIGS. 8a and 8b respectively, with shaping according to the invention illustrated in FIG. 4c.
Figure 8B:
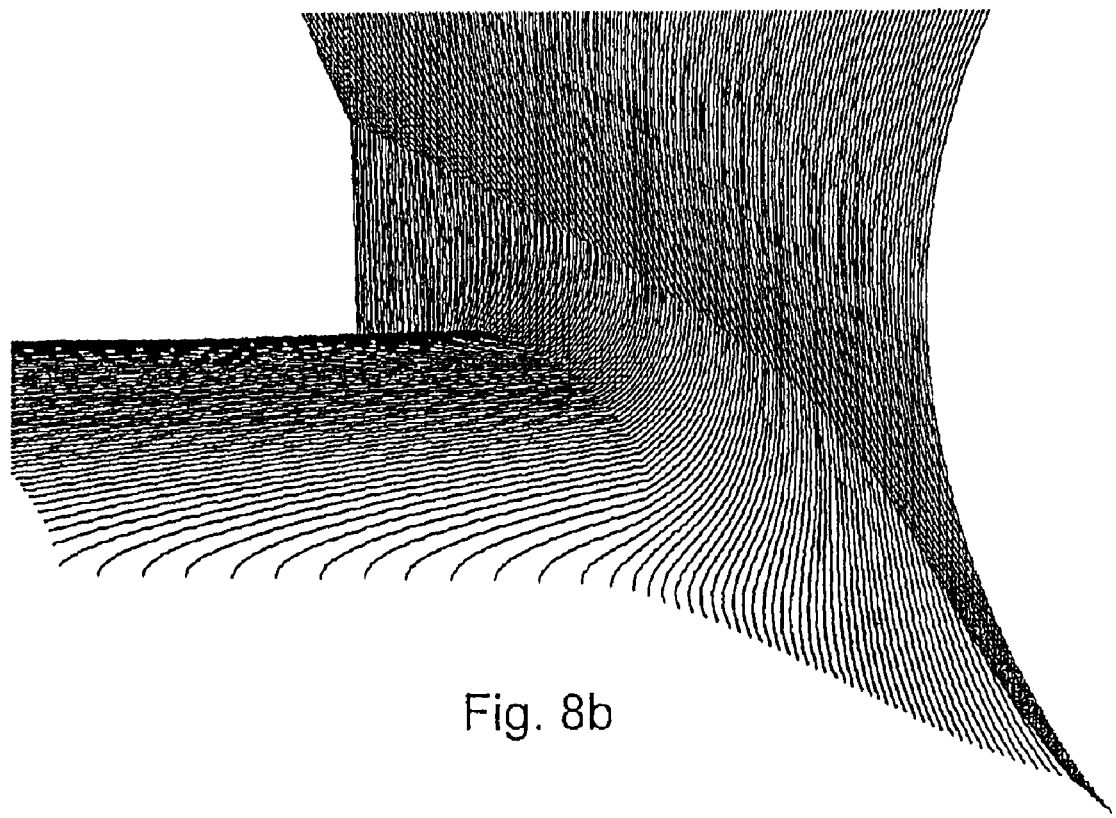
Figure 8D:
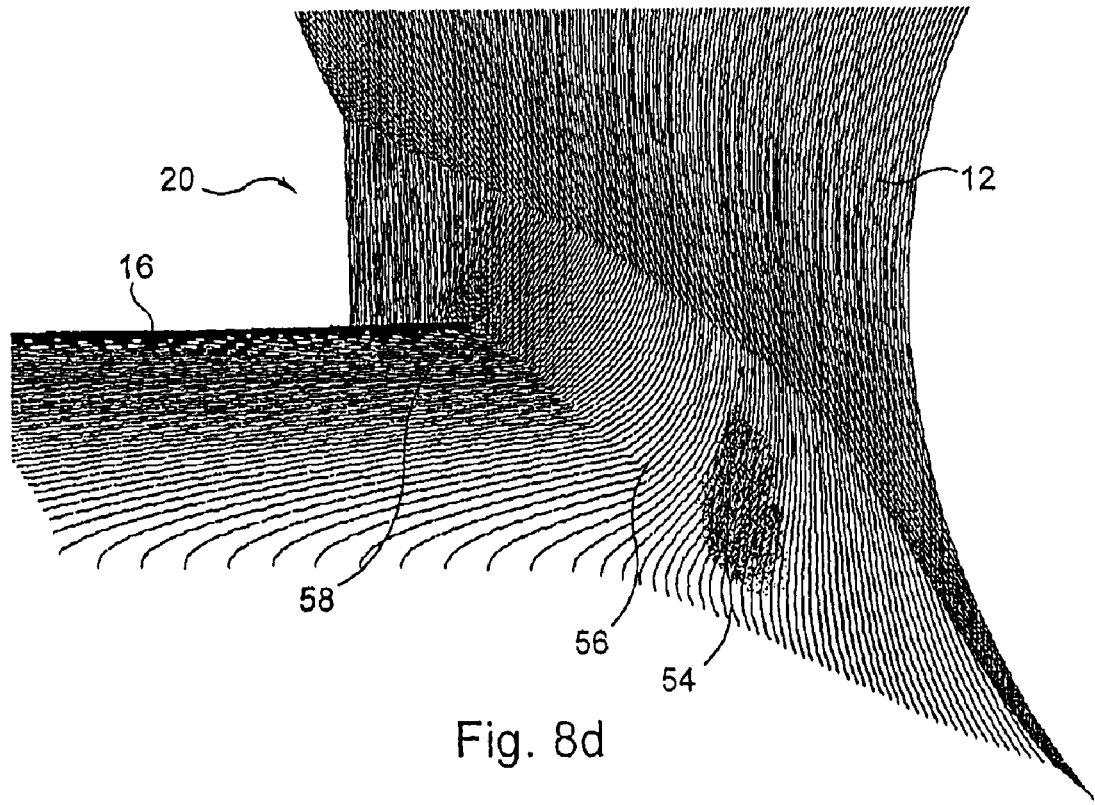

As represented in FIGS. 8a and 8b, a central fairing of an aircraft of A320 type is not provided with special shaping of its surface joined to the upper surface of the wing structure.

It will also be noted that this surface has a very slight and regular even zero, overall curvature.

The system according to the invention for adjusting air pressure over the wing structure provides for arranging, on the upper surface of the central fairing, an alternation of local convexities and concavities, for example a succession composed of a first hump 54, a hollow 56 and a second hump 58, such as represented in FIG. 4c.

First hump 54 begins close to the leading edge and second hump 58 ends following the flow direction (in a longitudinal direction extending along the fuselage), close to the joint between the fixed part of the wing structure and the flaps.

More particularly, first hump 54 has an amplitude maximum ranging between 5% and 10% of the root chord, starting from the leading edge, while second hump 58 has an amplitude maximum ranging between 20% and 30% of the root chord.

These two humps 54 and 58 are separated by a hollow 56 without slope discontinuity in this example. The hollow is made at a distance situated between 10% and 20% of the wing root chord, starting from the leading edge.

It will be noted that the order of magnitude of the lateral extension (amplitude) of the humps in the direction of the wingtip is, for example, 100 mm for first hump 54 and 400 mm for second hump 58.

Furthermore, the values pertaining to the location of the humps and of the hollow as well as their extension in the direction of the wingtip are adjustable according to the airflows over the wing structure, and especially the local airflow velocity thereover, as well as the local manufacturing and maintenance constraints.

The invention makes it possible, without jeopardizing the design of the wing structure, to act at a distance on the supersonic flow thereof by introducing locally one or more local geometric deformations of the regular surface or surfaces of each central fairing in contact with the upper and lower surface respectively of the wing in question.

The invention claimed is:

1. An aircraft comprising:
   a fuselage; and
   two wings, to which are fixed engine nacelles, each wing being joined laterally to the fuselage on opposite sides thereof by a unitary central fairing, the central fairing including, on each wing, a first surface and a second surface opposite the first surface, the first and second surfaces being joined to upper and lower surfaces of the wing, respectively, and extending longitudinally along the fuselage,
   wherein at least one of the first and second surfaces includes at least one local geometric deformation configured to generate in a controlled manner lateral aerodynamic perturbations from the central fairing toward the wing to control airflow over the wing.

2. An aircraft according to claim 1, wherein the at least one local geometric deformation comprises a primary curvature that extends along the fuselage in a longitudinal direction and a secondary curvature that extends along a height of the fuselage in a direction transverse to the longitudinal direction.

3. An aircraft according to claim 1, wherein the at least one local geometric deformation is defined by a reduction of the local radius of curvature of at least one surface zone.

4. An aircraft according to claim 1, wherein a location and an amplitude of the at least one local geometric deformation depend on aerodynamic parameters of the aircraft.

5. An aircraft according to claim 4, wherein the aerodynamic parameters relate to the fuselage, the wings, the engine nacelles, and a speed of the aircraft.

6. An aircraft according to claim 1, wherein the local geometric deformation is shaped as a local convexity.

7. An aircraft according to claim 6, wherein the convexity is shaped as a hump.

8. An aircraft according to claim 1, wherein the local geometric deformation is shaped as a local concavity.

9. An aircraft according to claim 8, wherein the concavity is shaped as a hollow.

10. An aircraft according to claim 9, wherein the hollow is defined by two inclined surface portions that intersect at a bottom of the hollow in a zone of slope discontinuity.

11. An aircraft according to claim 1, wherein at least one of the first and second surfaces includes a plurality of successive local geometric deformations extending along the fuselage and alternating locally between convexity and concavity.

12. An aircraft according to claim 1, wherein the at least one local geometric deformation is on the first surface joined to the upper surface of the wing.

13. An aircraft according to claim 1, wherein the at least one local geometric deformation is on the second surface joined to the lower surface of the wing.

14. An aircraft according to claim 1, wherein the central fairing includes an assemblage of a plurality of panels, each of the panels having a surface portion, and
   wherein each of the first and second surfaces of the central fairing on each wing is formed by a group of surface portions of the plurality of panels arranged next to one another.

15. The aircraft according to claim 1, wherein the first and second surfaces extend longitudinally along the fuselage such that a portion of the wing immediately adjacent to the fuselage is entirely surrounded by the first and second surfaces.

16. The aircraft according to claim 1, wherein the at least one local geometric deformation is behind a leading edge of the wing.

17. The aircraft according to claim 1, wherein the generated lateral aerodynamic perturbations include pressure waves that propagate in a direction of a free tip of the wing.

18. An aircraft comprising:
   a fuselage;
   two wings connected to the fuselage on opposite sides thereof; and
   a central fairing that joins each wing laterally to the fuselage, the central fairing including a first surface and a second surface, the first and second surfaces being joined to upper and lower surfaces of the wing, respectively, and extending longitudinally along the fuselage,
   wherein at least one of the first and second surfaces is configured to be mechanically deformed in flight so as to include at least one local geometric deformation that generates lateral aerodynamic perturbations from the central fairing toward the wing to control airflow over the wing.

19. An aircraft comprising:
   a fuselage; and
   two wings, to which are fixed engine nacelles, each wing being joined laterally to the fuselage on opposite sides thereof by a central fairing, the central fairing including, on each wing, a first surface and a second surface opposite the first surface, the first and second surfaces being joined to upper and lower surfaces of the wing, respectively, and extending longitudinally along the fuselage,
   wherein at least one of the first and second surfaces includes at least one local geometric deformation configured to generate lateral aerodynamic perturbations from the central fairing toward the wing to control airflow over the wing, and
   wherein at least one of the first and second surfaces includes a plurality of successive local geometric deformations extending along the fuselage and alternating locally between convexity and concavity.

20. An aircraft comprising:
a fuselage; and
two wings, to which are fixed engine nacelles, each wing being joined laterally to the fuselage on opposite sides thereof by a unitary central fairing, the central fairing including, on each wing, a first surface and a second surface opposite the first surface, the first and second surfaces being joined to upper and lower surfaces of the wing, respectively, and extending longitudinally along the fuselage, wherein at least one of the first and second surfaces includes at least one local geometric deformation configured to generate lateral aerodynamic perturbations from the central fairing toward the wing to control airflow over the wing, and wherein the at least one local geometric deformation is shaped as a local convexity disposed behind a leading edge of the wing.

* * * * *